United States Patent [19]
Vann

[11] 3,848,124
[45]*Nov. 12, 1974

[54] METHOD AND APPARATUS FOR DETERMINING COMMUNICATION OF A PERFORATED ZONE WITH A SECOND ZONE

[76] Inventor: Roy R. Vann, P.O. Box 38, Artisia, N. Mex. 88210

[*] Notice: The portion of the term of this patent subsequent to Jan. 9, 1990, has been disclaimed.

[22] Filed: Dec. 15, 1972

[21] Appl. No.: 315,605

Related U.S. Application Data

[63] Continuation-in-part of Ser. No. 109,381, Jan. 25, 1971, Pat. No. 3,710,114.

[52] U.S. Cl. .............................. 250/260, 250/303
[51] Int. Cl. ................... G01v 5/00, G21h/5/02
[58] Field of Search .......................... 250/260, 303

[56] References Cited
UNITED STATES PATENTS

| | | | |
|---|---|---|---|
| 2,433,718 | 12/1947 | Teplitz | 250/260 |
| 3,050,629 | 8/1962 | Gant et al. | 250/303 |
| 3,348,052 | 10/1967 | Raifsnider et al. | 250/303 |
| 3,426,204 | 2/1969 | Sutton | 250/303 |
| 3,710,114 | 1/1973 | Vann | 250/260 |

*Primary Examiner*—Archie R. Borchelt
*Attorney, Agent, or Firm*—Marcus L. Bates

[57] ABSTRACT

Method for locating the presence of passageways formed longitudinally of a borehole which communicates a production zone with a second zone, by placing isotopes adjacent the well casing at spaced apart locations above and below the perforated zone, or alternatively, by placing spaced apart isotopes adjacent the borehole wall above and below the perforated zone of the borehole. The spaced apart isotopes have a half life or decay rate which enables the translocation of either of the isotopes to be traced or ascertained with radiation measuring apparatus.

The apparatus includes means for affixing the isotopes adjacent the casing or adjacent the borehole wall, with the isotopes being vertically spaced apart by the cement which attaches the casing to the borehole wall so that should cracks or tunneling permit the flow of fluid to occur along an undesired flow path, the location of the undesired flow path can be determined and remedial action taken to cure the defect.

18 Claims, 10 Drawing Figures

PATENTED NOV 12 1974　　3,848,124
SHEET 1 OF 2
FIG. 1
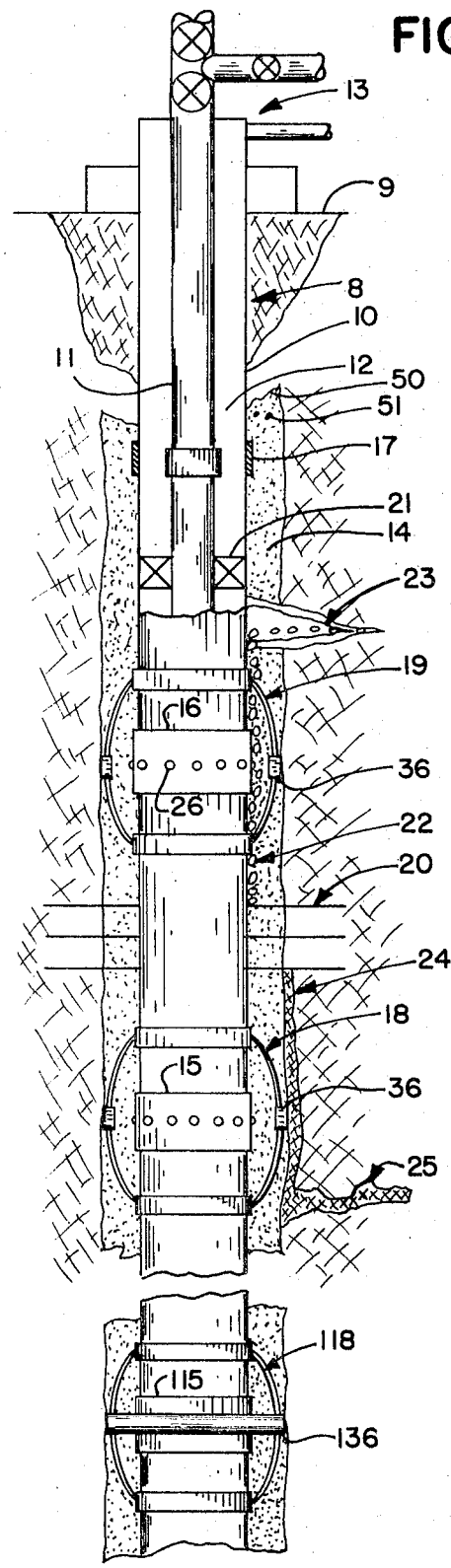
FIG. 2
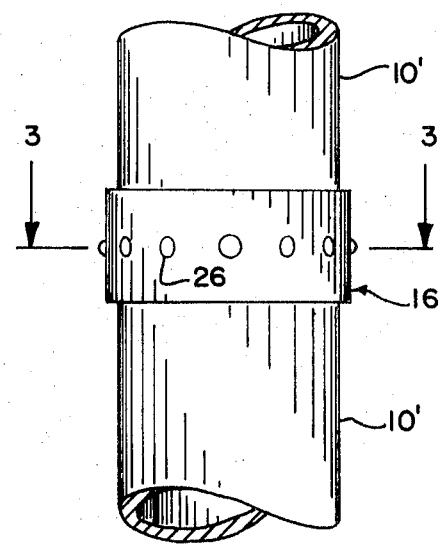
FIG. 3A
FIG. 3B
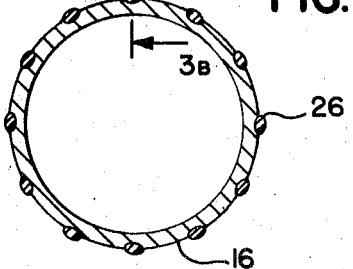
FIG. 4
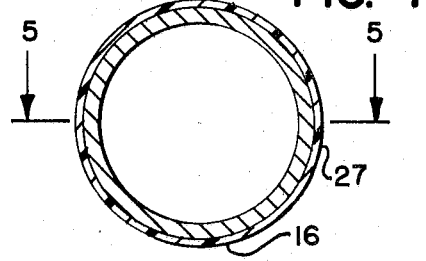

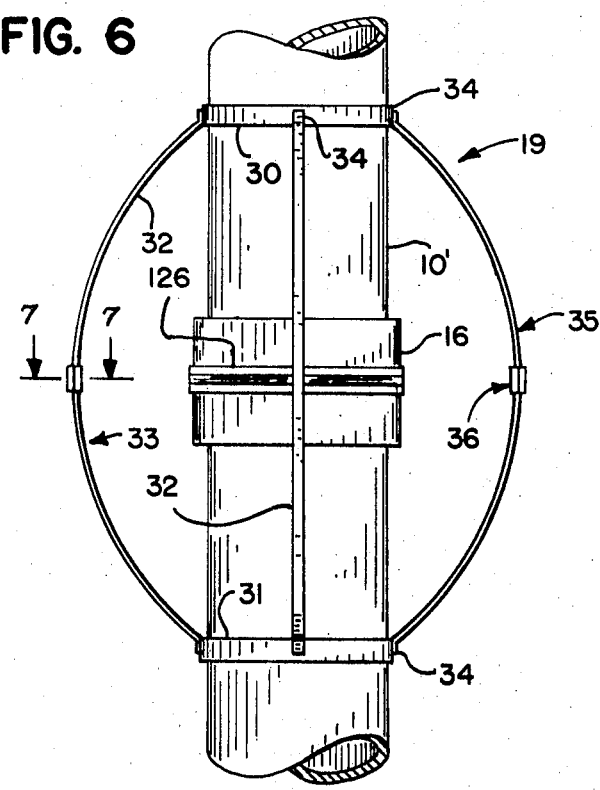
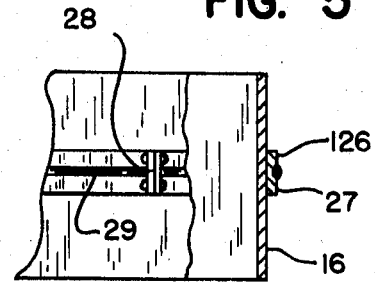
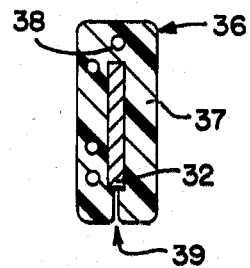
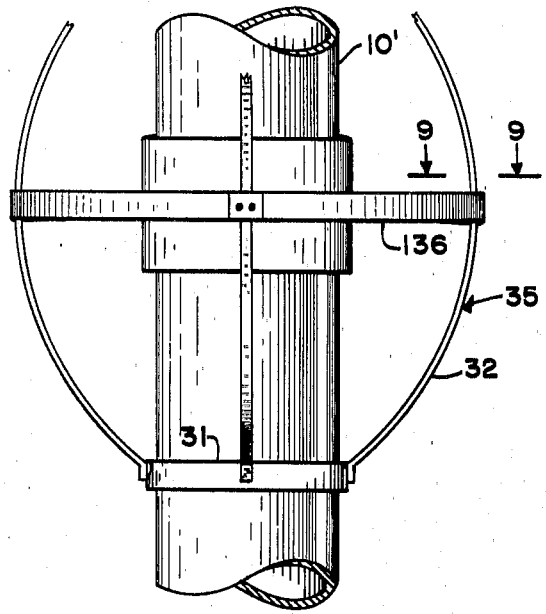
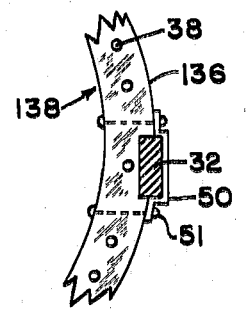

METHOD AND APPARATUS FOR DETERMINING COMMUNICATION OF A PERFORATED ZONE WITH A SECOND ZONE

RELATED PATENT APPLICATION

Ser. No. 109,381, filed Jan. 25, 1971, now U.S. Pat. No. 3,710,114, issued Jan. 9, 1973, of which this application is a continuation-in-part.

BACKGROUND OF THE INVENTION

After a borehole has been formed, the casing is usually cemented into place so as to isolate the production zone from other strata forming the well bore. After the casing has been cemented into place, and the cement has had sufficient time to "set," the casing and cement are usually perforated by using a jet perforating gun so as to communicate the oil producing strata with the interior of the casing. After perforation of the casing, the well is usually "acidized," after which the well is then "fractured" by pumping sand under pressure through the perforations and into the oil producing strata.

Often, prior to acidizing, the cement between the casing and the borehole annulus will contain an undetected defect therein which communicates the production zone with an undesirable portion of another formation of the borehole. Still at other times, the acidizing operation will open an undesirable passageway adjacent the casing or adjacent the borehole wall itself. These passageways extend longitudinally along the casing or the borehole wall, causing fluid to follow the path of least resistance uphole or downhole into another formation.

Still at other times, defects in the cement will be enlarged upon "fracturing" the well, whereupon communication will be established between the production formation and another formation either above or below the production formation.

Sometime, because of undetected defects in the cement, a well will be completed, placed on production, and found to be producing excessive water. Often such a well is plugged and decleared uneconomical for continued production. The primary cause of production of water in this instance can be attributed to a faulty cement job developing passageways extending longitudinally of the borehole which communicates the oil production zone with a water producing zone.

It is therefore desirable to be able to determine the structural integrity of the bond between the cement and the casing or between the cement and the well bore prior to either acidizing or fracturing a well in order to repair faulty cement, thus obviating the necessity of a second expensive well completion operation. It is also desirable to be able to determine the length and direction of a flow path or passageway which has been formed between a production formation and the point at which fluid flows away from the borehole and into another formation. It is furthermore desirable to be able to ascertain whether the acidizing operation were effected at the production zone, or if this material was wasted uphole or downwhole of the formation.

SUMMARY OF THE INVENTION

The present inventon comprehends a method of locating undesirable flow passageways formed longitudinally of a borehole due to defects in a previous cementing operation. The method includes placing a first isotope adjacent to the casing and at spaced apart positions within a borehole with the production formation being located therebetween. Alternatively, the isotopes are placed adjacent the borehole wall in spaced apart positions with the production formation being located therebetween. The isotopes have a decay rate or half-life which is measurably different from the background radiation, Each isotope is soluble in various well fluids which they may encounter as a result of a defective cementing operation.

The existence of longitudinal passageways is determined by a gamma ray survey. When abnormally high radio activity is observed adjacent the location where the isotopes were originally placed, no longitudinal passageways exist so as to translocate one of the isotopes. In the absence of such an indication, it is evident that the radio isotopes have been displaced or translocated by a fluid, and the gamma ray survey will indicate the area to which the isotopes were translocated, thereby positively locating and defining the length of the passageway as well as locating the area into which fluid from the perforated zone has flowed.

The above method is practiced by placing a first radio isotope about the outer peripheral surface of the well casing, with the isotope being placed at spaced apart locations with respect to each other and to the perforated zone; and, where it is desired to evaluate the area adjacent the borehole wall, by placing another radioactive isotope adjacent the inside peripheral surface of the borehole wall at spaced apart locations with respect to each other and to the production formation. The isotope is encapsulated within or admixed with a material which will be either dissolved or eroded away by the action of the well or treatment fluids associated with the borehole, such as water, acids, or hydrocarbons.

It is therefore a primary object of this invention to provide a method of determining the presence of undesirable passageways which have been formed longitudinally between the borehole wall and the inside peripheral wall of a casing.

Another object of this invention is the provision of method and apparatus for determining the characteristics of a flow path which is inadvertently formed between a production formation and another formation of a borehole.

Still another object of this invention is the provision of method and apparatus for locating faulty cement which bonds well casing to a borehole wall.

A further object of this invention is the provision of method and apparatus for determining the structural integrity of cement used to cement casing within a borehole.

Still a further object of this invention is to provide means for determining the existence of cracks, microannulus, tunneling, and other undesirable passageways by which communication may have been established between the hydrocarbon production zone of a borehole and another zone of the borehole.

The above objects are attained by the provision of apparatus fabricated in accordance with the above abstract and summary and by employment of the above described method.

These and various other objects and advantages of this invention will become readily apparent to those skilled in the art upon reading the following detailed description and by referring to the accompanying drawings and claims.

BRIEF DESCRIPTION OF THE DRAWINGS

FIG. 1 is a diagrammatical representation of a cross-sectional view of a portion of the earth having a borehole formed therein, with apparatus fabricated in accordance with the present invention being disposed therein;

FIG. 2 is an enlarged fragmentary representation of part of the apparatus seen in FIG. 1;

FIG. 3A is a cross-sectional view taken along line 3—3 of FIG. 2;

FIG. 3B is a cross-sectional view taken along line 3B—3B of FIG. 3A;

FIG. 4 sets forth a modification similar to that seen in FIG. 3A;

FIG. 5 is an enlarged fragmentary cross-sectional representation taken along line 5—5 of FIG. 4;

FIG. 6 is a fragmentary enlarged represenation of part of the apparatus disclosed in FIG. 1;

FIG. 7 is a cross-sectional view taken along line 7—7 of FIG. 6;

FIG. 8 is an enlarged fragmentary representation of part of the apparatus seen in FIG. 1; and FIG. 9 is a cross-sectional view taken along line 9—9 of FIG. 8.

DETAILED DESCRIPTION OF THE PREFERRED EMBODIMENTS

FIG. 1 schematically discloses a borehole 8 which extends downwardly from the surface of the earth 9 and which has a casing 10 cemented therein for at least a portion of its length. Within the casing there is usually axially disposed a longitudinally extending production tubing 11 which cooperates with the casing to form a casing annulus 12.

The well head 13 can take on several different forms which usually includes the illustrated valve arrangement. Between the casing and the borehole wall is a substantial thickness of cement 14, which has been placed in the illustrated position by various methods known to those skilled in the art.

The ends of the individual joints of casing are joined together by various connection means which may include flush jointed casing, buttress threaded joints, extreme line casing joints, and the like, which form various coupling means. The coupling means, regardless of its form, is generally referred to herein as a "collar." A collar is seen at 15, 16, 17, and 115. The collars are therefore spaced apart from one another by at least one joint of casing.

Centralizer 18, which is of conventional design, is connected in proximity of collar 15, and centralizer 19 is connected in proximity collar 16. Adjacent centralizers are spaced apart from one another and from a perforated production zone 20. Still another centralizer 118 is seen adjacent to collar 115.

The perforations in the casing, cement, and formation, which constitutes the perforated zone 20, can be formed by several different methods but a jet perforating gun is usually employed to penetrate into the production formation.

A packer 21 is seen affixed to the tubing string and to the inside wall of the casing but is not necessary for a comprehension of this invention.

As schematically illustrated by the arrow at numeral 22, the perforated zone 20 is in communication with a passageway which has been inadvertently formed between the exterior face of the casing and the interior surface of the cement. Th passageway may be of several different unknown appearances. The passageway forms a flow path which is following a line of least resistance extending from the production zone up to another formation, as generally indicated by the arrow at numeral 23.

The arrow at numeral 24 indicates another flow passageway which has been formed between the borehole wall and the exterior surface of the cement, creating a flow path extending from the perforated zone downhole to another zone or formation 25.

Each of the before mentioned collars 15 and 16 are provided with a plurality of small concavities placed radially about the outer marginal surface area thereof. Each of the concavities are filled with a first radio active material 26, also called a radio isotope, and hereinafter referred to as an "isotope."

As seen in the illustration of FIGS. 4 and 5, the first isotope can alternatively be placed within a circumferentially extending groove of a circumferentially extending plastic band 27. Another alternative is actually painting an isotope containing material thereon. As seen in FIG. 5, the plastic band 27 can be attached to the exterior wall surface of the casing by a fastener means such as seen at 28, if desired. Numeral 29 indicates a circumferentially extending groove placed within the band 27 for holding an isotope therein so as to dispose the isotope at the interface formed between the cement and the outer peripheral wall surface of the casing.

FIG. 6 discloses the details of the centralizers seen at 18, 118, and 19. The centralizer is of the usual construction and includes spaced apart, slidably received, circumferentially extending bands 30 and 31 which support a plurality of radially spaced apart bows 32. Bands 30 and 31 are slidably captured by the enlargement presented by the fastener means exemplified by the collar 16.

The bands are bowed in the usual manner as indicated by the arrow at numeral 33. The second isotope 36 is affixed to a mid-portion of each of the bands at a position where the band contacts the borehole wall. The second isotope is held within the illustrated U-shaped body 37. The body has an enlarged central portion defined by the spaced apart legs which encircle a marginal length of the bow. The entrance into the U-shaped portion of the body is indicated by the arrow at numeral 39. The legs may be sprung apart the required amount to enable them to be placed about the bow, where their natural resiliency will anchor them in place.

A plurality of longitudinally aligned drilled passageways 38 contain the isotope. It will be noted that the side of the body which scrapes the wall of the borehole as the casing is being run into the hole is devoid of an isotope because this portion of the body could be abraded away, thereby depositing the isotope along the wall surface of the borehole, and accordingly, producing a false reading when the hole is logged at a subsequent date.

As seen in FIGS. 8 and 9, the second isotope can be placed within the illustrated circumferentially extending band 136 which ultimately is cemented into position adjacent to the well bore and exteriorly of the cement, as seen at 136, for example. This expedient presents an isotope which circumferentially extends about the entire periphery of the borehole wall.

Where desired, the isotope 38 can be incorporated within the band 136 in the before described manner of the collar, that is, by painting the material onto the external surface of the band, save the outermost band surface where the isotope may inadvertently be rubbed onto the borehole wall surface before reaching the proper location downhole. The isotope alternatively can be placed within a circumferentially extending groove 138 located on either the inner, upper, or lower band face, so as to expose a limited longitudinal length of the isotope to 360° of the borehole wall surface.

Where deemed desirable, in each pair of isotopes 26 or 36, a first isotope can be used at 15, for example, and a second isotope used at 26, for example, with the fist and the second isotopes having a different half-life so as to enable a radio survey to differentiate one from the other.

Similarly, the isotopes at 36 in centralizer 19 can have a different half-life as compared to the isotope 36 used in the centralizer 18. Moreover, where two spaced pairs of spaced isotopes are employed; as for example 15, 16 and 18, 19, it is advantageous to use four isotopes each of which measurably exhibit a different half-life so as to enable radiation detecting apparatus to distinguish one from the other.

OPERATION

In operation, after the borehole has been formed, as the casing is assembled and run into the hole, the first isotope is placed at spaced apart elevations downhole and uphole of the area to be perforated. The isotope can be placed adjacent to the casing and circumferentially positioned thereabout at an infinite number of positions as seen illustrated in FIGS. 5 qnd 6, or at radially spaced apart positions as indicated in FIGS. 3 and 4.

Either before or after the centralizers have been placed about the casing, the bodies or bands containing the isotopes are attached to selected ones of the individual bows. The side of the body containing the isotope is preferably arranged inwardly disosed with respect to the borehole wall, so as to present an isotope-free wearing surface to the wall. The side of the body which is abraded away by the inside peripheral wall surface of the borehole can be provided with a layer of steel, if desired, or the entire body can be made of metal, if desired.

It is not essential that the first pair of isotopes 26 be used in conjunction with the second pair of isotopes 36. Further, where two pair of isotopes 26 and 36 are used, it is not essential that the first pair of isotopes be located immediately adjacent the corresponding isotopes of the second pair. There are advantages to using one pair of isotopes 26 separate from the use of the pair of isotopes 36 as well as using both pairs of isotopes arranged in the before described spaced apart manner, such as seen illustrated at 136 in FIG. 1, for example.

It is essential, however, that the first pair of isotopes be located adjacent to the casing and spaced apart uphole and downhole from the zone to be perforated. It is also essential that the second pair of isotopes be located adjacent to the borehole wall at spaced apart locations uphole and downhole of the zone to be perforated, when a second pair is employed.

After the casing has been cemented into place, a gamma ray survey should be made to assure that no cavity or tunneling or fracturing of the cement has inadvertently occurred, and also to assure that the various pairs of isotopes are properly located in the desired location within the borehole, as well as obtaining a log which shows the normal disposition and radiation measurements of the isotopes.

After the borehole is perforated, if production so warrants, the well may be placed on stream or into production with no subsequent treatment. However, should production be unsatisfactory, the borehole is again logged by running another gamma ray survey, the results of which should be identical to the first survey if the cement has been properly affixed to the casing and to the borehole wall. If the log indicates that tunneling through or around the cement has not inadvertently occurred, increased production by acidizing the well, followed by fracturing treatment can next be carried out, if desired.

After acidizing the well, and before the expensive fracturing treatment, the well should again be logged to make sure that the acid was pumped through the perforations and into the formation, and that the acidizing operation did not produce undesirable communication between the perforated zone and another formation. Should it be found that the acidizing treatment did indeed form passageways through or around the cement, then the acid failed to flow through the perforations and into the production zone, and accordingly, the faulty cementing operation must be repaired and the well again completed in the above described manner. Accordingly, the analysis made in accordance with the invention has avoided an expensive and redundant fracturing operation.

On the other hand, should the log indicate that the acidizing operation was successful, then the well is next fractured and again subjected to a gamma ray survey to make certain that the fracturing treatment was effected at the perforated zone and not inadvertently at another formation 23 or 25, for example. If the completion of the well was satisfactorily carried out as evidenced by the isotopes remaining in their original positions, and if the well log shows that a good production zone exists, then the well must produce hydrocargons.

Should any of the above gamma ray surveys indicate that one of the isotopes have been translocated from their original position, then obviously one of the following determinable conditions has been brought about:

1. The first uphole isotope 26 has been translocated uphole to another formation 23.
2. The first downhole isotope at 15 has been translocated downwhole in a manner similar to (1).
3. The second downhole isotope 36 has been translocated downhole to another formation 25.
4. The second uphole isotope 36 has been translocated uphole to another formation in a manner similar to (3).

Accordingly, when fluid flows either to or from the production zone along the interface between the cement and casing or the cement and the borehole wall, the longitudinal length and direction of the passageway respective to the borehole can be determined by a gamma ray survey which will indicate a lack of radioactivity adjacent the original location of the osotopes and an abrupt change in the radioactivity at the location to which the isotope was washed. The area to be recemented can be restricted to this location.

The isotope can be admixed or incorporated in a vehicle which is selectively soluble in any one of the following: hydrocarbons, water, or acid. It may sometime be advantageous to select a vehicle which is soluble in acid alone, or water alone, or a hydrocarbon alone, or a combination thereof. For example, a sugar, such as common candy, can be used. As another example, a hard petroleum wax can be used to encase the isotope. A still further example is a water-insoluble or a water-soluble salt.

Those skilled in the art will recognize many other suitable isotopes and vehicles which can be advantageously employed in carrying out this invention, the above being examples only.

The sampling and analytical procedures used herein are safe, thoroughly developed, and reliable. The low radiation levels required of the instant isotopes are detectable with commercially available low level radio active counting devices which eliminates many of the hazards usually associated with the handling of radioactive materials.

After having read this disclosure, those skilled in the art of making and using isotopes will understand the desirability of using various different combinations of materials for the first and second isotopes, other than the materials suggested herein. As an example only, iridium 192 has a half-life of 74 days is available in several different forms suitable for use as one of the isotopes. Iodine 131 which has a half-life of 8.1 days can be used as the second isotope. However, iodine 131 is destroyed by acid and must therefore be provided with a protective coating, such as encapsulating the material to provide a small pellet, so as to avoid its destruction.

Reference is made to the Tables of Nuclidic Data for further characteristics of radio isotopes having a half-life from a few seconds to many years, and from which there can be selected pairs of isotopes which are suitable for any desired downhole situation embraced by this invention.

I claim:

1. In a borehole having a casing cemented therein with the cement filling the annulus between the casing and the borehole wall, wherein the casing and cement have been perforated adjacent a potential production zone; the method of locating the presence of passageways formed externally of the casing and longitudinally of the borehole comprising the steps of:
    1. placing a first isotope uphole and a second isotope downhole of the perforations, said isotopes having a known half-life, said isotopes being placed at the interface formed between the cement and the casing wall;
    2. analyzing the borehole near the perforated zone to determine the translocation of either of the isotopes to thereby determine the length and direction of any passageway which may be found, and to determine the location of the passageway with respect to the perforated zone.

2. The method of claim 1 and further including the step of:
    3. placing the isotopes in the borehole prior to cementing the casing into place.

3. The method of claim 2, and further including the following additional step:
    4. adding an isotope to the cement as it is initially pumped into the borehole annulus so as to enable subsequent analysis to show the location of the top of the cement plug in the borehole annulus.

4. The method of claim 1 and further including the steps of:
    3. acidizing the perforated zone of the borehole;
    4. repeating step (2) to determine the presence of the passageways before fracturing the borehole.

5. The method of claim 1, and further including the step of:
    3. placing the first and second isotopes at radially spaced apart positions about the outside peripheral wall surface of the casing.

6. The method of claim 1, and further including the step of:
    3. placing the recited isotopes within a cavity formed on the outside wall surface of the casing.

7. The method of claim 1 wherein the isotopes are protected by an oil soluble material so that an isotope, when contacted by hydrocarbons, is admixed with and flow along with the hydrocarbons.

8. The method of claim 1 wherein the isotopes are protected by a water soluble material so that an isotope, when contacted by water, is admixed with the flows along with the water.

9. The method of claim 1 wherein the isotopes are protected by a material which releases the isotope when contacted by an acid solution so that an isotope, when contacted by an acid solution during an acidizing operation, will be admixed and flow along with the acid solution.

10. In a borehole having a casing cemented therein with the cement filling the annulus between the casing and the borehole wall, wherein the casing and cement have been perforated adjacent a potential production zone; the method of locating the presence of passageways formed externally of the casing and longitudinally of the borehole comprising the steps of:
    1. placing a first isotope uphole and a second isotope downhole of the perforations, said isotopes having a known half-life; said isotopes being placed at the interface formed between the cement and the borehole wall;
    2. analyzing the borehole near the perforated zone to determine the translocation of either of the isotopes to thereby determine the length and direction of any passageway which may be formed, and to determine the location of the passageway with respect to the perforated zone.

11. The method of claim 10 and further including the step of:
    3. placing the isotopes in the borehole prior to cementing the casing into place.

12. The method of claim 11 and further including the following additional step:
    4. adding an isotope to the cement as it is initially pumped into the borehole annulus so as to enable subsequent analysis to show the location of the top of the cement plug in the borehole annulus.

13. The method of claim 10, and further including the steps of:
    3. acidizing the perforated zone of the borehole;
    4. repeating step (2) to determine the presence of any passageways which may have been formed after acidizing and before fracturing the borehole.

14. The method of claim 10, and further including the steps of:

3. placing the first and second isotopes at radially spaced apart positions about the inside peripheral wall surface of the borehole wall.

15. The method of claim 10, and further including the step of:

3. placing the first and second isotope on two centralizers, and placing one of said centralizers above and another of said centralizers below the perforated zone.

16. In a borehole having a casing cemented therein with the cement filling the annulus formed between the borehole wall and the casing, wherein the casing and cement have been perforated adjacent a potential production zone, apparatus for locating the presence of passageways formed externally of the casing and longitudinally of the borehole, comprising:

a first and a second isotope; means affixing said isotopes externally of the casing at spaced apart locations above and below the perforated zone; so that, communication between the perforated zone and another zone spaced apart from the perforated zone can be determined by a gamma ray survey of the borehole.

17. The apparatus of claim 16 wherein the means affixing the first isotope externally of the casing includes a collar, means forming a depression in said collar, a vehicle which is soluble in well fluid, said isotope being admixed with said vehicle and placed in said collar.

18. The apparatus of claim 16 wherein the half-life of said first isotope and the half-life of said second isotope differ from one another an amount which can be measured with a gamma ray survey.

* * * * *

UNITED STATES PATENT OFFICE
CERTIFICATE OF CORRECTION

Patent No. 3,848,124      Dated November 12, 1974

Inventor(s) ROY R. VANN

It is certified that error appears in the above-identified patent and that said Letters Patent are hereby corrected as shown below:

Column 7, line 59, substitute --present-- for "found".

Column 8, line 48, substitute --present-- for "formed".

Signed and sealed this 4th day of February 1975.

(SEAL)
Attest:

McCOY M. GIBSON JR.
Attesting Officer

C. MARSHALL DANN
Commissioner of Patents